ART OF PRODUCING MUSICAL SOUNDS ELECTRICALLY

Original Filed Dec. 4, 1933 2 Sheets-Sheet 1

Inventor
Gilbert Smiley
By Williams, Bradbury, McCaleb & Hinkle
Attorneys

ART OF PRODUCING MUSICAL SOUNDS ELECTRICALLY

Original Filed Dec. 4, 1933 2 Sheets-Sheet 2

Inventor
Gilbert Smiley

By Williams, Bradbury, McCaleb & Hinkle
Attorneys

Reissued Aug. 9, 1938

Re. 20,825

UNITED STATES PATENT OFFICE 20,825

ART OF PRODUCING MUSICAL SOUNDS ELECTRICALLY

Gilbert Smiley, Hingham, Mass., assignor, by mesne assignments, to Hammond Instrument Company, Chicago, Ill., a corporation of Delaware Original No. 2,036,892, dated April 7, 1936, Serial No. 700,837, December 4, 1933. Application for reissue March 28, 1938, Serial No. 198,616

12 Claims. (Cl. 84—1)

My present invention has for its object to produce musical sounds electrically. A more specific object of my invention is to provide a circuit arrangement for producing an output wave which possesses the harmonics, required under certain conditions, to render a given note musically desirable or pleasing to the ear.

Still another object contemplated is the provision of means for adding to a more or less pure sinusoidal wave of given frequency, as derived from an appropriate oscillator or appropriate oscillators, one or more additional harmonics of the fundamental of said wave at a proper amplitude, or for the reinforcement of harmonics already present but of insufficient amplitude, by the use of a vacuum tube repeater from the output of which the resultant wave form may be amplified and reproduced by a loud speaker.

To these and other ends my invention comprises further improvements all of which will be more fully set forth in the following specification and the novel features pointed out in the accompanying claims.

In the drawings.

Similar reference characters in the several figures indicate like parts.

Figure 1:
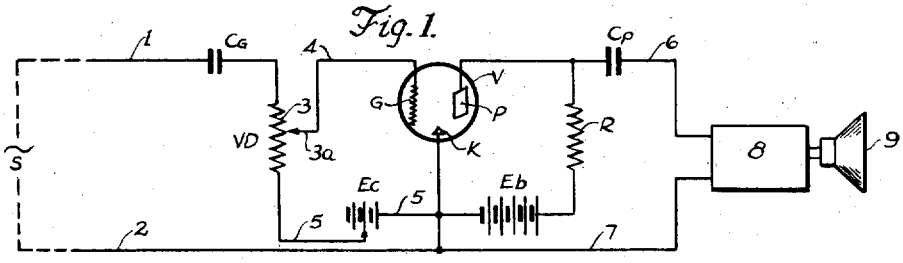
Fig. 1 is a diagrammatic illustration of a vacuum tube circuit for repeating audible frequency oscillations and applying thereto the desired characteristic wave form.

In illustrating my invention I have shown a repeater circuit comprising a vacuum tube V having a plate P, a grid G and a cathode K. The input circuit, across which the incoming oscillations are impressed, comprises the conductors 1 and 2, the former leading through a blocking condenser $Cg$ to one end of a voltage-divider 3 the slider 3$a$ of which is connected by a conductor 4 to the grid G, and the latter leading directly to the cathode K. The other end of the divider 3 is connected to the cathode by a conductor 5 in which a biasing source of potential Ec for the grid is provided. The output circuit comprises the plate and cathode leads 6 and 7, which may be connected to an amplifier 8 in turn feeding into a loud speaker 9, as will be understood. The plate lead 6 has a blocking condenser $Cp$ connected therein. The plate-cathode circuit comprises the source Eb for supplying the operating potential to the plate P and the resistance R through which said potential is supplied and which serves as a coupling resistance in the output circuit. The condensers $Cg$ and $Cp$ prevent the operating D. C. potentials from being transmitted through the input and output terminals to the instrumentalities connected thereto.

Any convenient source or sources of oscillations feed into the input conductors 1 and 2. In Fig. 1 I have shown a single source S connected to these conductors. In my development of musical instruments for the playing of chords, however, I employ a series of independent or dependently related sources of oscillations, such as vacuum tube oscillatory circuits, tuned to the various frequencies called for by the various keys of the keyboard. Thus, several or all of these oscillatory circuits may be adapted to feed into the repeater circuit shown in Fig. 1, each oscillatory circuit so connected being arranged to supply a proper proportion of its output when the key associated with the frequency or note which it produces is struck or depressed. If desired, a separate repeater circuit may nevertheless be provided for each of the sources, each repeater circuit receiving the proper intensity of output from its associated source when the latter's key is depressed. The keyboard may be of conventional construction used in electrical musical instruments such, for example, as that diagrammatically illustrated in my Patent No. 2,083,246, dated June 8, 1937, or as shown in the patent to Cahill No. 1,213,804, dated January 23, 1917. For the production of single notes, the repeater circuit of Fig. 1 may be associated with a single oscillator, the frequency of which is controllable by suitable means cooperating with the keyboard.

I have found in practice that in many of the types of oscillators or generators of audible frequency voltage waves, the wave form produced is too pure, i. e., too close to a sinusoidal wave to create various desirable musical effects. In other words, such a wave form does not reproduce a musical note acceptable for many purposes, as it is lacking in timbre.

My invention contemplates broadly introducing an oscillatory wave of a pure or insufficiently impure form into a repeater circuit and there introducing the necessary harmonics to produce what is known in a musical sense as overtones, the final output from the repeater being a wave form which, by proper control, is caused to render a note similar or identical to that sounded by an instrument it may be desired to simulate, or, moreover, to create discrete tonal effects, not necessarily imitative of existing instruments, but none the less pleasing and desirable. In general this is accomplished by the introduction in the repeater circuit of such controlling elements that the harmonic content of the output wave may be widely varied to permit desired and desirable tonal effects to be attained.

The object desired may be accomplished by controlling both the grid bias of the repeater tube V and the amplitude of the input wave and taking advantage of the repeater tube characteristics. The grid bias may be controlled by proper adjustment of the potential of the supply Ec, and the amplitude of the input wave may be controlled by proper adjustment of the slider 3a on the voltage-divider 3.

Figure 2:
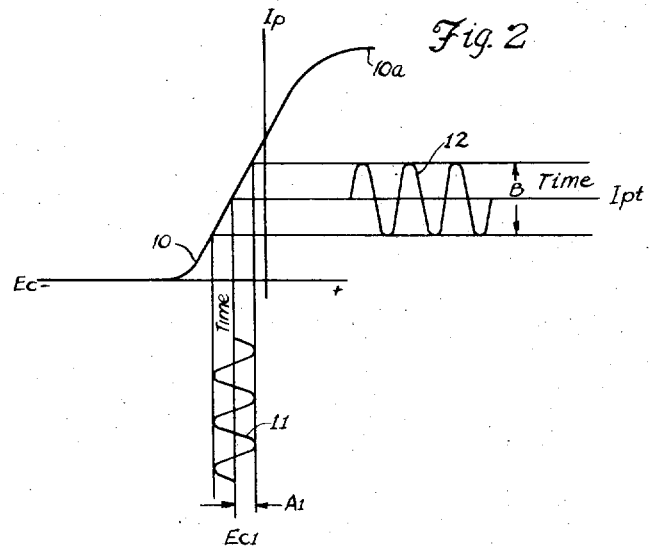
Figs. 2 to 5 are plate-current curves versus grid-potential curves, illustrating the manner in which my invention is accomplished.

The curve 10 shown in Figs. 2 to 5 inclusive illustrates the plate-current characteristic of a repeater tube V such as I may employ in accordance with my invention. In Fig. 2 this tube is operated as a linear repeater, in which case the output wave, which corresponds to the plate current wave 12, is an amplified facsimile of the grid potential wave 11 produced by the influence of the incoming fluctuating wave. In operating the repeater circuit in this instance the grid bias potential is selected, as indicated by the axis Ec1, to fall at about the center of the straight portion of the plate current characteristic curve 10. This bias is such that equal grid potential changes, within certain limits, produce equal plate current changes about the steady plate current, indicated by the axis Ip1, resulting under the steady bias conditions. Thus, practically no distortion results when alternating potential of amplitude A1 is applied to the grid G, causing an output wave of double amplitude B between crests to be established about the plate axis Ip1.

Figure 3:
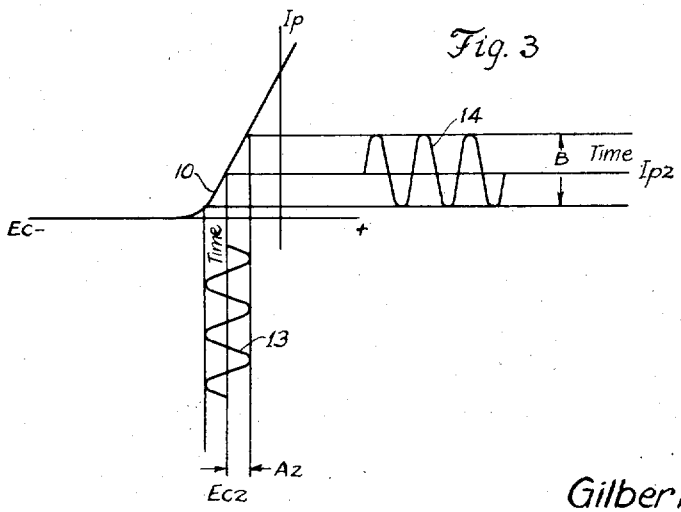

A comparison of the figure just described with Fig. 3 shows how harmonics of appreciable magnitude may be introduced in the output wave by increasing the grid operating potential in a negative direction. The amplitude of the grid potential wave is at the same time slightly increased to the value A2, which is done to maintain the desired double amplitude B of the output wave in the plate circuit. As seen, the input wave 13 is established along the new axis Ec2, which results in shifting the plate axis to Ip2 along which the output wave 14 is correspondingly distorted from its former approximately sinusoidal form shown in Fig. 2.

Figure 4:
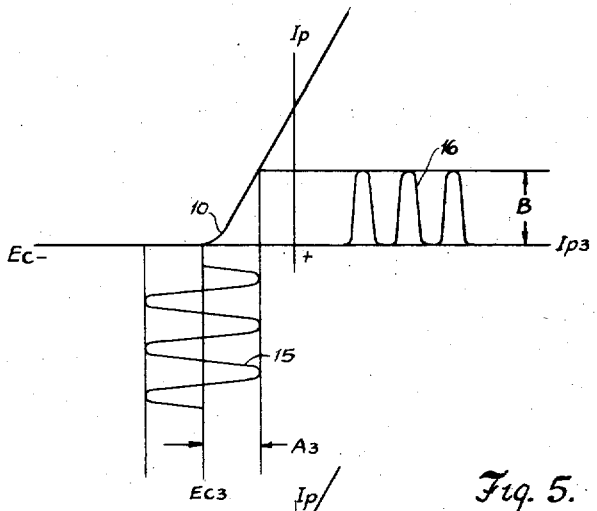

In Fig. 4 I have illustrated the bias of the grid of the repeater tube adjusted to place the input axis at the cut-off point Ec3 of the plate current characteristic curve 10. In this case the amplitude of the input voltage must be considerably increased, as its new value A3 indicates, in order to maintain the output corresponding to a fluctuating flow of current in the plate circuit at the same amplitude as before. As observed, the output wave 16 established along the new axis Ip3 as a result of the grid potential fluctuations 15 is in this instance definitely distorted, its wave form introducing such harmonics as to adapt it for certain musical purposes.

Figure 5:
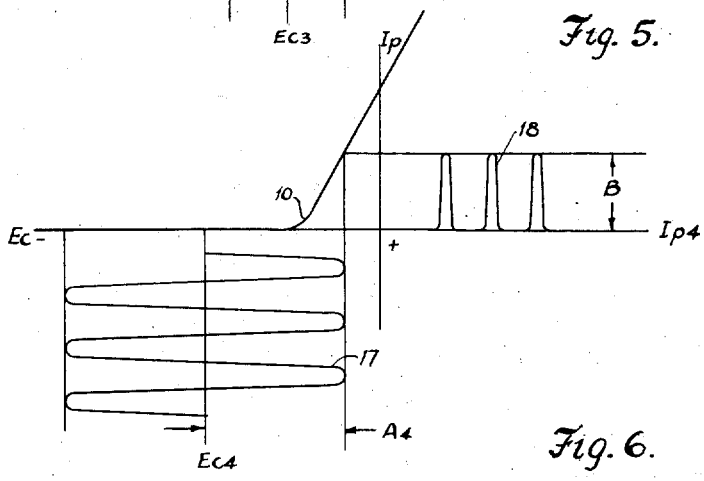

Fig. 5 shows a further adjustment of the grid bias to a point Ec4 beyond the cut-off point of the tube and it is seen that, in order to continue the output at the same double amplitude B, it is necessary to still further increase the amplitude of the input wave, as shown by A4. The input wave is indicated by 17 and, as observed, the form of the corresponding output wave 18 established along the axis Ip4 departs to a still greater degree from that supplied to the repeater input, plate current passing only during the crests of the more positive half cycles of the input wave.

Figure 6:
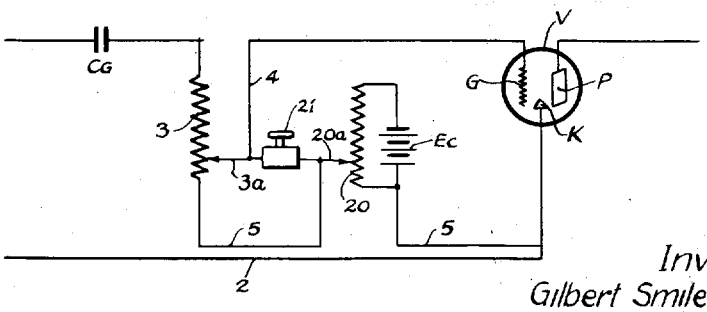
Fig. 6 is a schematic illustration of a means for effecting simultaneous adjustments of grid supply-potential and input wave amplitude.

From the above description it is apparent that the present invention provides the distinct advantage that various musical effects as to timbre or tone quality of the notes produced may be obtained by proper adjustment of the operating parameters of the tube V. Satisfactory control of the resultant wave form supplied to the amplifier 8 and loud speaker 9 is in this manner effected without the use of variable filter means otherwise necessary for such control, were a sufficiency of harmonics in the first place available. In practice, the operating parameters of the tube may be made variable, either continuously or in predetermined steps, between conditions for maximum linearity or minimum distortion and conditions for any selected maximum of distortion. In either case, the amplitude of the input wave and the operating potential at the grid may be adjustable simultaneously to maintain their proper relationship for an essentially constant apparent volume output. An arrangement for such simultaneous adjustment is shown schematically in Fig. 6. A voltage-divider 20 is connected across the source Ec and its slider 20a is operated conjointly with the slider 3a of the divider 3, as by a common handle 21. If desired, the amplifier 8 may include suitable filter means for the elimination of undesirable or over-amplitude harmonics or their attenuation to negligible or desirable amplitude in the manner known in the art. It is understood that the operating parameters of the tube may be selected to produce desired harmonics of a desired amplitude and thereafter made permanent. In this instance a filter means is provided for controlling the harmonic content.

It is understood that, if desired, such values of operating potential Ec may be provided at the grid of the tube V as to cause the input potential changes to swing through the upper portions 10a (Fig. 2) of the characteristic curve 10. The distorting effects which are obtained in this manner are similar to those which have been described. In this instance the more the grid supply-potential is increased in a positive direction, the richer is the harmonic content of the output wave. It is, of course, understood that the more the grid supply-potential is increased in a positive direction, the greater the amplitude to which the input wave should be adjusted to maintain the intensity of the output wave substantially constant. However, this distortion is much the same as will be realized by operation on the low plate current end of the curve 10, and has the disadvantage that, in some instances, the grid of the tube V will draw current placing an appreciable load on the oscillatory source, which may, in some instances, destroy stability of fundamental frequency. Further, in drawing current, the grid may introduce certain high order harmonics which are usually musically undesirable. For these reasons it is generally preferable to operate the grid in the more negative region, though the invention comprises all possibilities of deliberate distortion in repeater circuits.

Although the invention is illustrated in the drawings and described herein in connection with a single repeater tube, it is understood that circuits involving a plurality of repeater tubes, each of which is operated in a manner as described, may be used to produce other desirable musical effects. For example, a pair of non-linearly operated repeater tubes may be used in a "push-pull" arrangement, i. e., symmetrically disposed in a back-to-back circuit connection. Assuming the required balance between such tubes, no even harmonics will be found to exist in the output wave other than those already in the input wave.

I claim:

1. In a musical instrument, the combination with means for producing electrical oscillations of audible frequency, of a harmonic introducing thermionic tube repeater circuit to which said oscillations are supplied, said repeater circuit comprising means for varying its grid operating potential to vary the harmonic content of its output oscillations, said repeater circuit also comprising means for varying the amplitude of the input oscillations at its grid to maintain the intensity of its output oscillations substantially constant.

2. In a musical instrument, the combination with means for producing an audible frequency electrical wave of substantially pure sinusoidal form, of a wave distorting thermionic tube repeater circuit to which said wave is supplied, said repeater circuit comprising means for varying its grid supply-potential to vary the form of its output wave, said repeater circuit also comprising means for varying the amplitude of the input wave at its grid to maintain the intensity of its output wave substantially constant.

3. In a musical instrument, the combination with means for producing electrical oscillations of audible frequency, of a harmonic introducing thermionic tube repeater circuit to which said oscillations are supplied, said repeater circuit comprising means for varying its grid supply-potential to vary the harmonic content of its output oscillations, said repeater circuit also comprising means for varying the amplitude of the input oscillations at its grid to maintain the intensity of its output oscillations substantially constant, said supply-potential varying means in one of its positions of adjustment effecting a bias value at cut-off or beyond causing maximum introduction of harmonics.

4. In a musical instrument, the combination with means for producing an audible frequency electrical wave of substantially pure sinusoidal form, of a wave distorting thermionic tube repeater circuit to which said wave is supplied, said repeater circuit comprising means for varying its grid supply-potential to vary the form of its output wave, said repeater circuit also comprising means for varying the amplitude of the input wave at its grid to maintain the intensity of its output wave substantially constant, said supply-potential varying means in one of its positions of adjustment effecting a bias value at cut-off or beyond, causing maximum wave distortion.

5. In a musical instrument, the combination with means for producing electrical oscillations of audible frequency, of a harmonic introducing thermionic tube repeater circuit to which said oscillations are supplied, said repeater circuit comprising means for varying its grid supply-potential to vary the harmonic content of its output oscillations, said repeater circuit also comprising means for varying the amplitude of the input oscillations at its grid to maintain the intensity of its output oscillations substantially constant, said supply-potential varying means effecting harmonic introduction between conditions for substantial absence of harmonic introduction and conditions for a predetermined maximum of harmonic introduction.

6. In a musical instrument, the combination with means for producing an audible frequency electrical wave of substantially pure sinusoidal form, of a wave distorting thermionic tube repeater circuit to which said wave is supplied, said repeater circuit comprising means for varying its grid supply-potential to vary the form of its output wave, said repeater circuit also comprising means for varying the amplitude of the input wave at its grid to maintain the intensity of its output wave substantially constant, said supply-potential varying means effecting wave distortion between conditions for substantial absence of wave distortion and conditions for a predetermined maximum wave distortion.

7. In a musical instrument, the combination with means for producing electrical oscillations of audible frequency, of a harmonic introducing thermionic tube repeater circuit to which said oscillations are supplied, said repeater circuit comprising means for varying its grid operating potential to vary the harmonic content of its output oscillations, said repeater circuit also comprising means simultaneously operated with said operating potential varying means for varying the amplitude of the input oscillations at its grid to maintain the intensity of its output oscillations substantially constant.

8. In a musical instrument, the combination with means for producing an audible frequency electrical wave of substantially pure sinusoidal form, of a wave distorting thermionic tube repeater circuit to which said wave is supplied, said repeater circuit comprising means for varying its grid supply-potential to vary the form of its output wave, said thermionic circuit also comprising means simultaneously operated with said supply-potential varying means for varying the amplitude of the input wave at its grid to maintain the intensity of its output wave substantially constant.

9. In a musical instrument, the combination with means for producing electrical oscillations of audible frequency, of a harmonic introducing thermionic tube repeater circuit to which said oscillations are supplied, said repeater circuit comprising an adjustable source of grid-supply potential for varying the harmonic content of its output oscillations, and a voltage-divider for varying the amplitude of the input oscillations at its grid to maintain the intensity of its output oscillations substantially constant.

10. In a musical instrument, the combination with means for producing electrical oscillations of audible frequency, of a harmonic introducing thermionic tube repeater circuit to which said oscillations are supplied, said repeater circuit comprising an adjustable source of grid-supply potential for varying the harmonic content of its output oscillations and a voltage-divider for varying the amplitude of the input oscillations at its grid to maintain the intensity of its output oscillations substantially constant, said voltage-divider and said adjustable source being operated simultaneously.

11. For use in an electrical musical instrument having a keyboard consisting of a plurality of keys adapted for playing chords, a circuit combination comprising, a series of sources of electrical frequencies tuned to the various pitches called for by the various keys of said keyboard, a separate repeater circuit for each of said sources, each of said repeater circuits including a multi-electrode thermionic discharge device having a cathode, grid, and plate, an attenuation device for regulating the amplitude of the signal supplied to said grid from its associated source; and means for biasing said grid negatively with respect to said cathode to the point where appreciable plate current will flow only during brief intervals of most positive excursion of grid voltage, for the purpose of introducing musically desirable harmonics, in regulatable amounts, in each note separately.

12. For use in an electrical musical instrument having a keyboard consisting of a plurality of keys adapted for playing chords, a circuit combination comprising, a series of sources of electrical frequencies tuned to the various pitches called for by the various keys of said keyboard, a separate repeater circuit for each of said sources, each of said repeater circuits including a multi-electrode thermionic discharge device having a cathode, grid, and plate, means for regulating the amplitude of the signal supplied to said grid from its associated source; and means for biasing said grid negatively with respect to said cathode to the point where appreciable plate current will flow only during brief intervals of most positive excursion of grid voltage, for the purpose of introducing musically desirable harmonics, in regulatable amounts, in each note separately.

GILBERT SMILEY.